(12) United States Patent  (10) Patent No.: US 6,364,141 B1
Ehrgott  (45) Date of Patent: Apr. 2, 2002

(54) FAST TRACK SHELVING SYSTEM

(76) Inventor: Glenn Alan Ehrgott, 7 Spring La., Long Valley, NJ (US) 07853

( * ) Notice: Subject to any disclaimer, the term of this patent is extended or adjusted under 35 U.S.C. 154(b) by 0 days.

(21) Appl. No.: 09/303,530

(22) Filed: Apr. 30, 1999

(51) Int. Cl.[7] .................................................. A47F 5/00
(52) U.S. Cl. ...................... 211/189; 211/70.6; 211/193; 211/191; 211/103; 211/208
(58) Field of Search .................... 211/189, 90.02, 211/90.04, 193, 192, 190, 191, 208, 103, 87.01, 70.6; 248/221.11, 222.11, 323, 339, 340, 302, 303; 401/101, 104, 105, 116, 149, 150

(56) References Cited

U.S. PATENT DOCUMENTS

| | | | |
|---|---|---|---|
| 3,730,108 A | * | 5/1973 | Stroh |
| 4,033,268 A | * | 7/1977 | Klekar |
| 4,171,789 A | * | 10/1979 | Vander Hoek et al. . 211/192 X |
| 4,318,486 A | | 3/1982 | Bobrowski |
| 4,475,855 A | | 10/1984 | Crissy et al. |
| 4,723,663 A | | 2/1988 | Learn |
| 4,852,747 A | | 8/1989 | Beveglieri |
| 4,867,623 A | | 9/1989 | Lloyd |
| 4,869,378 A | | 9/1989 | Miller |
| 4,880,192 A | * | 11/1989 | Vombraucke et al. .. 211/70.6 X |
| 4,982,922 A | | 1/1991 | Krause |
| 5,028,184 A | | 7/1991 | Krause |
| 5,116,003 A | | 5/1992 | Gerhardt |
| 5,224,609 A | | 7/1993 | Bauer |
| 5,265,992 A | | 11/1993 | Jensen |
| 5,322,256 A | | 6/1994 | Kanwischer |
| 5,524,803 A | * | 6/1996 | Arvidsson ............... 410/150 X |
| 5,720,138 A | | 2/1998 | Johnson |
| 5,740,927 A | | 4/1998 | Yemini |
| 5,752,791 A | * | 5/1998 | Ehrlich ....................... 410/101 |
| 5,785,475 A | * | 7/1998 | Winstel et al. .......... 410/149 X |
| 5,788,192 A | * | 8/1998 | Poole ...................... 211/193 X |
| 5,807,047 A | | 9/1998 | Cox |
| 5,839,589 A | | 11/1998 | Hillard |
| 5,934,849 A | * | 8/1999 | Haire ..................... 410/101 X |

* cited by examiner

Primary Examiner—Robert W. Gibson, Jr.
(74) Attorney, Agent, or Firm—Stein & Stein; Steven B. Stein (57) ABSTRACT

The present invention provides a storage device comprising (a) a receiving member comprising one or more receiving member receptacles, the receiving member receptacle being defined by opposing end edges; and (b) an insertion member comprising (i) a body portion capable of supporting a cantilever load and (ii) a retention device portion capable of being stably inserted into the receiving member receptacle. The present invention further provides a free standing storage system. The present invention also provides a storage system mountable to a fixed surface.

12 Claims, 13 Drawing Sheets

FAST TRACK SHELVING SYSTEM

FIELD OF THE INVENTION

The present invention relates to a storage system and more particularly to a storage system which is adjustable. The storage system comprises support structures supported a tone end which are capable of directly supporting objects of various shapes and sizes and their resulting loads. More specifically, the provided storage system is capable of supporting a cantilever load or tension load. The present invention provides a storage system which can be used more safely in a plurality of environments than the prior art.

BACKGROUND OF THE INVENTION

Wall-based and free-standing storage units are well-known in the art. Such units are either individually secured to a wall or cooperate with a dedicated rail, slot, or channel or are used with a peg board or slat wall arrangement. (See U.S. Pat. Nos. 4,318,486; 4,723,663; 4,982,922; 4,867,623; 4,852,747; 5,224,609; 5,265,992; 5,322,256; 5,740,927; 5,807,047 and; 5,839,589). Such arrangement may utilize horizontal bars or rails on which brackets or hooks are mounted in order to support various items. Storage units have been described having hooks permanently attached to specified points on a bar. Other storage systems describe sliding brackets captured on a rail. Additionally, other storage systems provide a changeable, slidable bracket utilizing an open-ended fastener at the back of the bracket which is slipped over the top of the rail. See, U.S. Pat. No. 3,260,489. Further systems employ rackets with fasteners which are trapped on a rail (See, U.S. Pat. Nos. 2,291,966 and 2,546,720). Further still, storage systems have been described which provide wall systems which are readily adjustable to differently shaped loads capable of supporting heavy loads. (See, U.S. Pat. No. 4,318,486). Such systems provide a mounting rail carrying brackets with U-shaped fastener sections which grip the rail but which can be slipped off at one or more grooves in the rail. The wall based systems described herein above limit the type of devices that can be stored. The slidable variety of the systems limit the number of brackets or limit the changing of brackets after the rail or equivalent has been mounted. Importantly, in a mobile environment, brackets could slide in alignment with an open groove and become dislodged or cause stored materials to collide with one another. Other disclosures have provided storage systems and fittings to be employed with a track member wherein the fitting has a positive pivotal retainer means that may be easily operated for locking and unlocking the fitting relative to the track. Such systems provide a secure fitting of cargo for transportation.

Anchor fittings have also been described. Such fittings provide for removably attaching objects to the floor or wall of a vehicle. Such fittings may be operate in conjunction with a track attached to a vehicle floor with the track having alternate notch and neck proportions which matingly engage the fittings. (See, U.S. Pat. Nos. 2,6888,504; 4,230,432; 4,256,424; 4,708,549; and 5,265,992). Such devices limit use to either a beam supported at both ends, a strap, or an anchor ring type device or opening which cooperates with common cargo control device such as a ratchet strap or load binder. Moreover, such devices do not provide for or solve the problem of a cantilever based storage system.

The present invention provide distinct advantages over the prior art and solves numerous problems long-described and understood in the field.

SUMMARY OF THE INVENTION

It is therefore an object of this invention to provide a storage device comprising (a) a receiving member comprising one or more receiving member receptacles, the receiving member receptacle being defined by opposing end edges; and (b) an insertion member comprising (i) an elongated body portion capable of directly supporting a object and its resulting load and (ii) a retention device portion capable of being stably inserted into the receiving member receptacle.

More specifically, it is an object of this invention to provide a free standing storage system. It is also an object of this invention to provide a storage system mountable to a fixed surface. Additionally, it is an object of the present invention to provide a receiving member of the provided storage system. Also, it is a further object of the present invention to provide the insertion member of the provided storage system.

Finally, it is an object of this invention to provide a method for storage of implements comprising using the provided storage system.

BRIEF DESCRIPTION OF THE FIGURES

FIGS. 16A–16B. Rake or Shovel Bracket.

DETAILED DESCRIPTION OF THE INVENTION

The present invention provides a storage device comprising (a) a receiving member comprising one or more receiving member receptacles, the receiving member receptacle being defined by opposing end edges; and (b) a storage device insertion member comprising in combination (i) one or more rigid elongated body capable of directly supporting an object and its resulting load and (ii) a retention device portion capable of being stably inserted into the receiving member receptacle.

The present invention provides a storage device comprising (a) a receiving member comprising one or more receiving member receptacles, the receiving member receptacle being defined by opposing end edges; and (b) an insertion member comprising (i) an elongated body portion capable of supporting an object which produces cantilever load and (ii) a retention device portion capable of being stably inserted into the receiving member receptacle. An alternative embodiment of the present invention is the insertion member comprising an elongated body portion capable of supporting an object which produces a tension load.

In one embodiment of the present invention, the retention device portion comprises one or more notches which define one or more resilient fingers, the notch formed to snugly fit into the receiving member receptacle. According to an embodiment of this invention the retention device portion comprises an upper notch and an opposing lower notch. According to an embodiment of this invention, the distance between the resilient fingers adjacent the upper notch and the resilient fingers adjacent the opposing lower notch is greater than the distance between the opposing end edges defining the receiving member receptacle.

According to another embodiment of the present invention, the retention device portion comprises one or more resilient fingers positioned so as to contact and engage an opposing end edge of the receiving member receptacle. According to an embodiment of this invention, the retention device portion further comprises one or more notches which define one or more resilient fingers adjacent the notch and positioned so as to contact and engage an opposing end edge of the receiving member receptacle. According to still another embodiment of this invention, the upper notch is larger than the lower notch.

According to a further embodiment of the present invention, the retention device portion further comprises a latching device capable of interfering with one of the opposing end edges of the receiving member receptacle. According to an embodiment of this invention, the latching device is movable with respect to the retention device portion. The latch may pivot, tilt, turn or slide. According to still another embodiment of this invention, the latching device comprises a mechanically actuated lever. According to still another embodiment of this invention, the mechanically actuated lever is actuated by compressing a resilient material. According to an embodiment of this invention, the resilient material is a spring. According to yet still another embodiment of the present invention, the latching device is disposed within the notch. According to an embodiment of the invention, the latching device or a portion thereof pivots with respect to the retention device portion. According to still yet another embodiment, of the present invention, the latching device or a portion thereof slides with respect to the retention device portion. Yet further, according to another embodiment of the present invention, the latching device is disposed between the resilient fingers and positioned so as to contact and engage an opposing end edge of the receiving member receptacle.

According to yet another embodiment of the present invention, a plurality of receiving member receptacles are linearly positioned along the receiving member. According to one embodiment of this invention, receiving member receptacle is rectangular in shape. In another embodiment the receiving member receptacle is square in shape. In yet another embodiment the receiving member receptacle is oblong in shape. In still another embodiment, the receiving member receptacle is ovoid in shape. In still yet another embodiment the receiving member receptacle is about circular in shape. In a further still embodiment, the receiving member receptacle is irregular in shape. It is contemplated that the receiving member receptacle may be of a variety of shapes and sizes and depths and widths and lengths. In a preferred embodiment, the receiving member receptacle is rectangular.

According to a further embodiment of the present invention, the receiving member is formed of (metal or plastic). It is contemplated that the receiving member may be fashioned from a variety of materials. In a preferred embodiment, the receiving member is metal. In a more preferred embodiment, the receiving member is formed from aluminum or steel. It is further contemplated that the receiving member may be light in weight while still retaining capacity to bear a significant cantilever weight load. According to a still further embodiment of the present invention, the receiving member is capable of being removably mounted on a fixed surface.

According to a yet still further embodiment of the present invention, body portion of the insertion member is elongated. According to one embodiment of the present invention, the body portion of the insertion member is selected from the group consisting of a hook, a ring a pronged implement holder and a bracket. It is contemplated that the body portion of the insertion member is capable of bearing a significant cantilever weight load. It is further contemplated that the body portion of the insertion member is capable of stably retaining a variety of implements including but not limited to tools, lumber, beams, girders, wire and lines.

Further still, the present invention provides a free standing storage system. Yet further still, the present invention provides a storage system mounted to a fixed surface.

According to an embodiment of this invention, the storage system is easily disassembled. According to another embodiment of this invention, the storage system is adjustable in height, length, density and spacing. According to still another embodiment of the present invention, the orientation of the receiving member is horizontal, vertical or diagonal.

Additionally, the present invention provides a box tube receiving member of the provided storage system. Also, the present invention is attached or attaches to the insertion member of the provided storage system.

Finally, the present invention provides a method for storage of implements comprising using the provided storage system.

The present invention may be practiced using common cargo control track. Such track is exemplified by but not limited to track known in the art as "E-track" or "A-track." Such track is a basis of providing horizontal and vertical track sections, as well as individual brackets with one or more receiving member receptacles. The track can be fastened to walls, ceilings, floors, or other fixed surfaces. Alternatively, the track may be fixed to or as free-standing support structures in order to provide a series of receiving member receptacles in which to engage insertion members as storage supports. Such a practice enables the user to hold various implements including, but not limited to shovels, rakes, pick axes, hammers, electrical extension cords, bicycles, spare tires, skis, shelves, emergency equipment and hoses. It is contemplated that the track or receiving member is fastened to an interior of an emergency vehicle. It is further contemplated that the track is fastened to the outside of such a vehicle or other type of mobile structure. The receiving member or its components and accessory devices may be color-coded. Such color coding facilitates rapid assembly of the system. Alternatively, emergency colors such as florescent yellow or orange or red provides indication of various emergency equipment. In another alternative example, color coding may indicate compatibility between various stored implements such as in an technical, medical, pharmaceutical, electrical or plumbing application. Moreover, in a technical setting or a medical setting, such color coding provides indication of compatible equipment, reagents, therapeutics or a particular sequence of use thereof A retention device is provided with the various storage support devices which allows them to be added or removed from the mounting track individually with or without tools, and without requiring the removal of adjacent support devices, providing ease of use and accommodating a number of combination of implements. Provision for a positive retention in the form of a latching device is also provided. Positive retention of insertion member support devices eliminates accidental dislodging thereby facilitating use in a wide variety of environments. Mobile environments, in particular are enabled by the positive retention latching device. Moreover, positive retention latches are not easily dislodged through motion and impact which is often associated with the removal and replacement of stored items. This makes the storage system of the present invention safer to use. The storage system of the present invention provides for the display of a number of different shaped and weighted items in a plurality of environments and settings.

As used herein, the term "cantilever" means a projecting beam, girder, post, pole, platform or other structure supported only at one end. As used herein, the term "pivot" means the rotation, swinging or shifting of a short rod, shaft or other member about a related part or member. As used herein, the term "receptacle" refers to an opening, space, groove, slot or hole capable of accepting by insertion another member or part. As used herein, the term "implement" means a tool, device or other utensil including, but not limited to a shovel, a rake, an axe, a spare tire, a cord, a wire, a hammer, a shelf, a hose and a jack.

Figure 1:
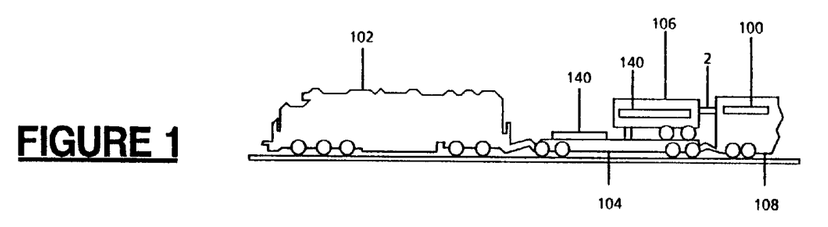
FIG. 1. Cargo Control Track. Cargo Control Track 140 is shown installed in various common vehicles such as on the floor of a flatbed rail car 104, on the walls of a tractor trailer cargo trailer 106, and on the walls of a railroad boxcar 108.
Figure 2:
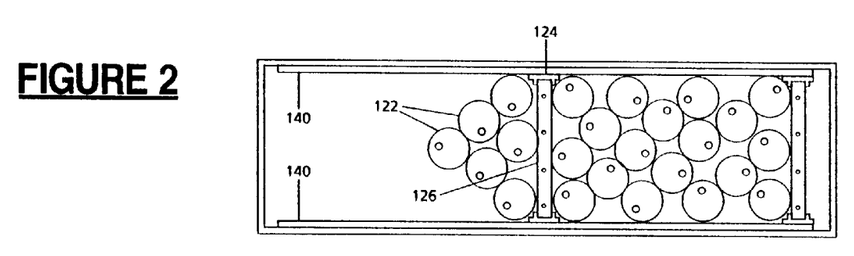
FIG. 2. Top Plan of the Trailer of FIG. 1. Top cutaway view inside the tractor trailer along reference line 2 of FIG. 1. This exemplifies a typical application of cargo control track 140 used to brace heavy cargo 122 from moving using cargo control pockets 124 and cargo control beams supported at both ends 126.
Figure 3:
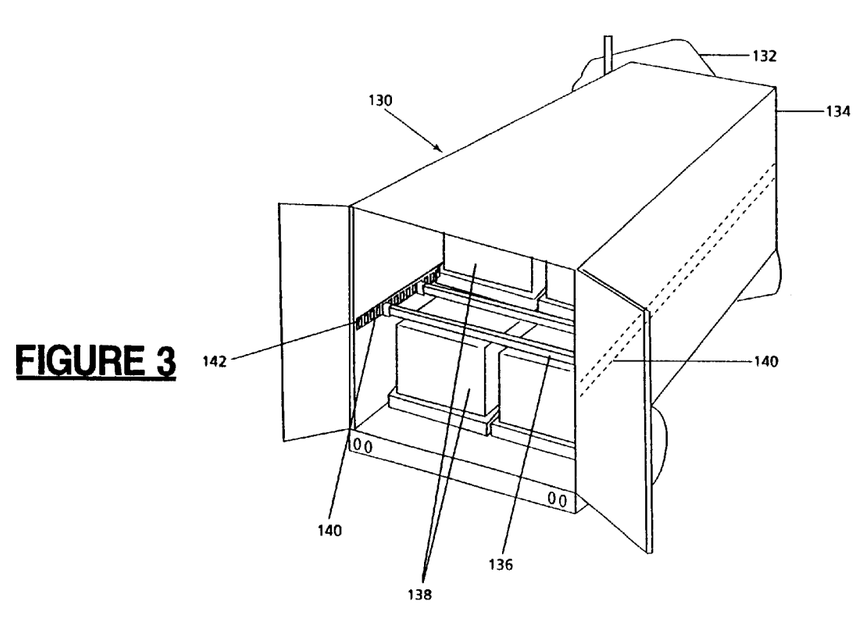
FIG. 3. Use of cargo control tracks 140 to support cargo control beams 136 in cargo control track receiving member receptacles 142 to support palletized cargo 138 inside a trailer 134 pulled by a truck 132 in a typical tractor trailer combination 130.
Figure 4:
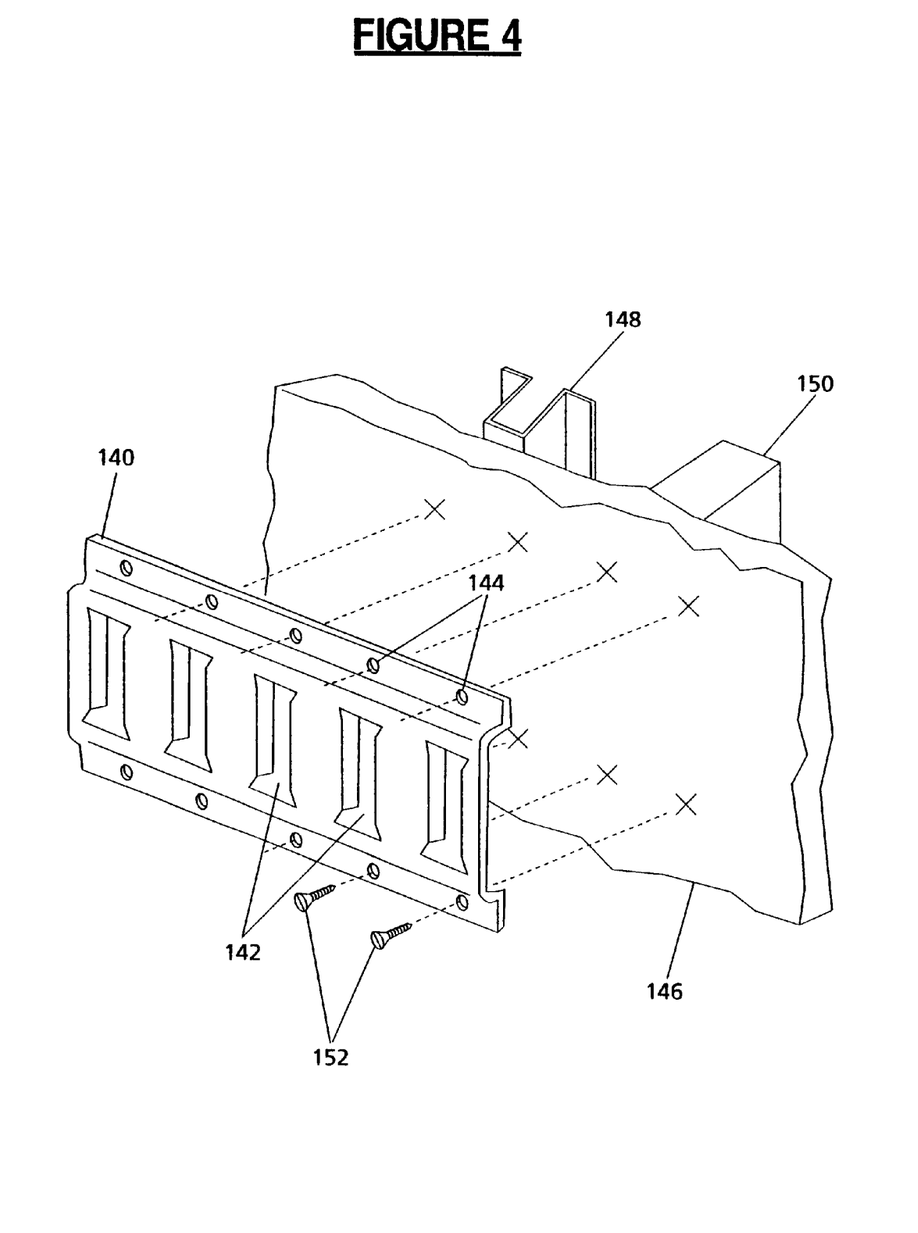
FIG. 4. Cargo control track 140 mounted to a planar surface 146 through the use of screws 152 placed through mounting holes 144. As alternatives to screws, a variety of fastening methods is contemplated including but not limited to bolts, welding, riveting, expansion anchors, and adhesives. The cargo control track may also be directly connected to another singular or multiple support member(s) such as a steel hat section 148 or wooden stud 150.

Referring now to the figures: The Cargo Control Track referred to as the "receiving member" of the provided storage system is shown in FIG. 1. Cargo Control Track 140 is shown installed in various common vehicles such as on the floor of a flatbed rail car 104, on the walls of a tractor-trailer cargo trailer 106, and on the walls of a railroad boxcar 108. FIG. 2 shows the top plan of the trailer of FIG. 1. The top cutaway view inside the tractor-trailer is shown along reference line 2 of FIG. 1. This exemplifies a typical application of cargo control track 140 used to brace heavy cargo 122 from moving using cargo control pockets 124 and cargo control beams supported at both ends 126. FIG. 3 depicts the use of cargo control tracks 140 to support cargo control beams 136 in cargo control track receiving member receptacles 142 to support palletized cargo 138 inside a trailer 134 pulled by a truck 132 in a typical tractor trailer combination 130. FIG. 4 presents cargo control track 140 mounted to a planar surface 146 through the use of screws 152 placed through mounting holes 144. As alternatives to screws, a variety of fastening methods is contemplated including but not limited to bolts, welding, riveting, expansion anchors, and adhesives. The cargo control track may also be directly connected to another singular or multiple support member(s) such as a steel hat section 148 or wooden stud 150. In another embodiment of this invention, the track may be formulated as a free-standing structure. An example of a free-standing structure is a table. The present invention contemplates a variety of free-standing structures including, but not limited to a table, a bench, a bookcase and a cabinet. Moreover, the present invention further con templates a free-standing structure comprising wheels. An example of such a formulation is a cart.

Figure 5:
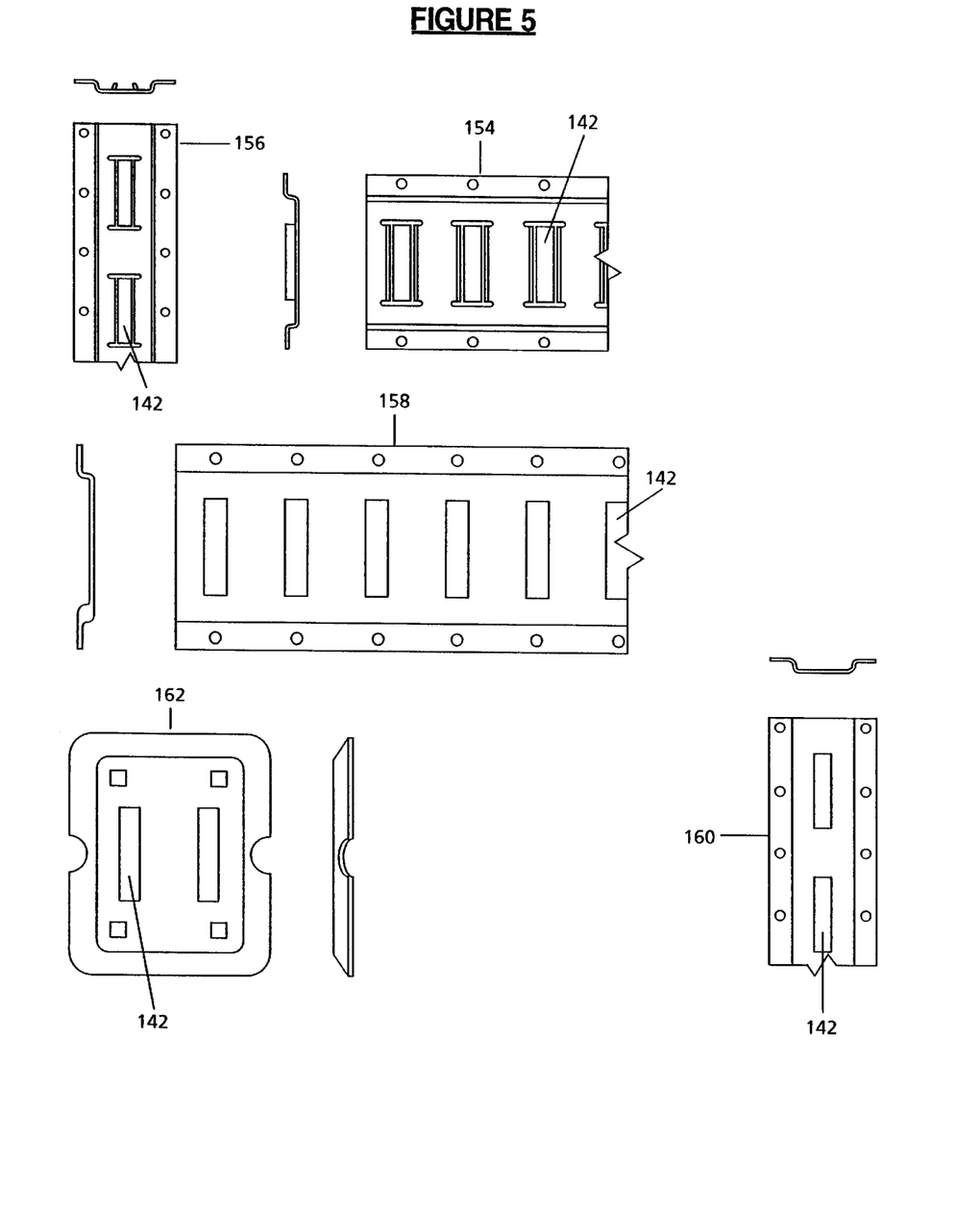
FIG. 5. Track sections including horizontal E-track 154, vertical E-track 156, horizontal A-track 158, vertical A-track 160, and series A-track 162. Such typical configurations are readily available and are used to provide one or more receiving member receptacles 142.

FIG. 5 depicts track sections including horizontal E-track 154, vertical E-track 156, horizontal A-track 158, vertical A-track 160, and series A-track 162. Such typical configurations are readily available and are used to provide one or more receiving member receptacles 142.

Figure 6:
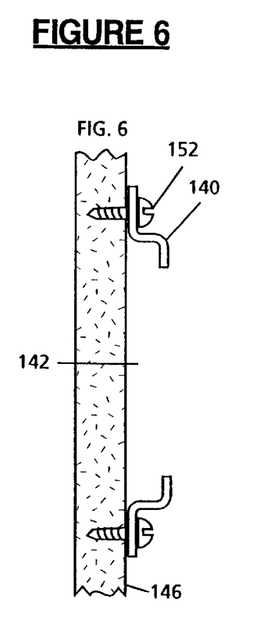
FIG. 6. Cross sectional view of a receiving member receptacle 142 in cargo control track 140, a fastener 152 and a cutaway view of cargo control track 140 attached to a supporting surface 146.
Figure 7:
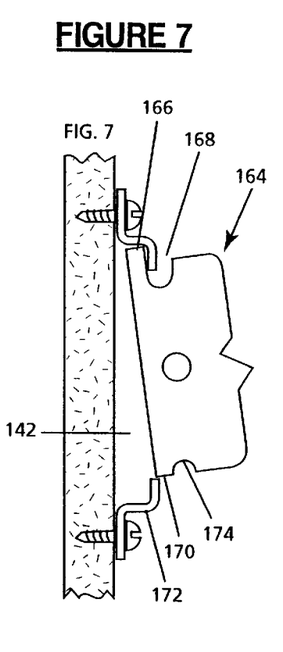
FIG. 7. Typical retention device 164 comprising an upper resilient finger 166 adjacent to an upper notch 168 enabling lifting retention device 164 while inserting upper finger 166 high enough to allow lower resilient finger 170 to clear the lower opposing end edge 172 of the receiving member receptacle 142 and be lowered.
Figure 8:
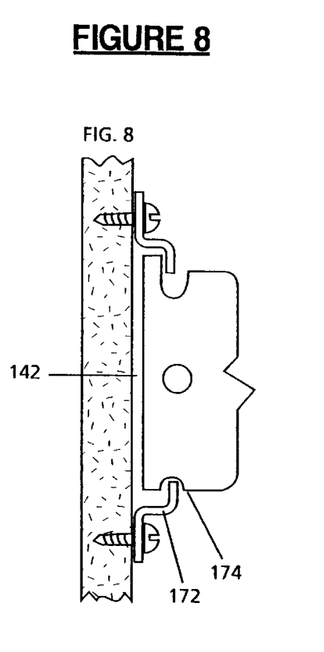
FIG. 8. Lower notch 174 engages the lower opposing end edge 172 of the receiving member receptacle 142. To remove the retention device, the retention device 164 is lifted, tipped tilted or pivoted and lowered from the receiving member receptacle.
Figure 9:
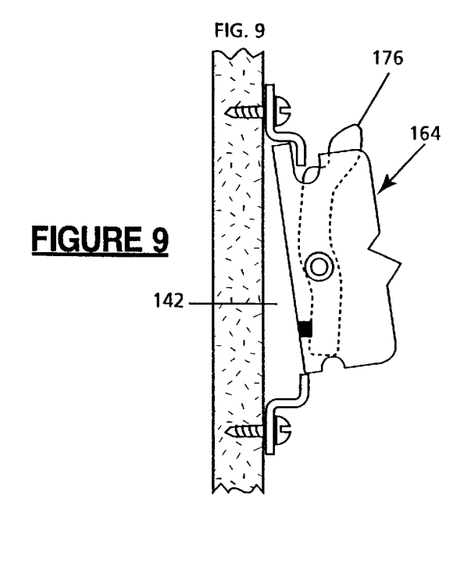
FIG. 9. Engagement of the retention device in a receiving member receptacle as in FIG. 8 adding a positive engagement latch 176 pulled back to enable lifting retention device 164 into the receiving member receptacle 142.
Figure 10:
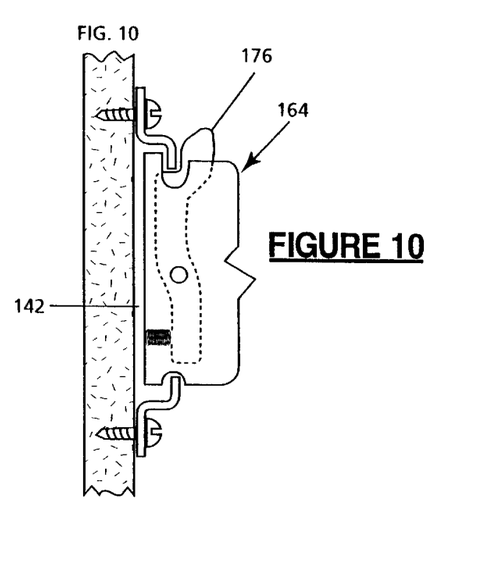
FIG. 10. The positive engagement latch 176 engaged in a position that restricts motion of the retention device thereby preventing its removal from the receiving member receptacle 142. To remove the fitting, positive engagement latch 176 is pulled back away from the receiving member receptacle 142, thereby enabling sufficient motion of the retention device 164 thereby enabling removal from the receiving member receptacle 142.
Figure 11:
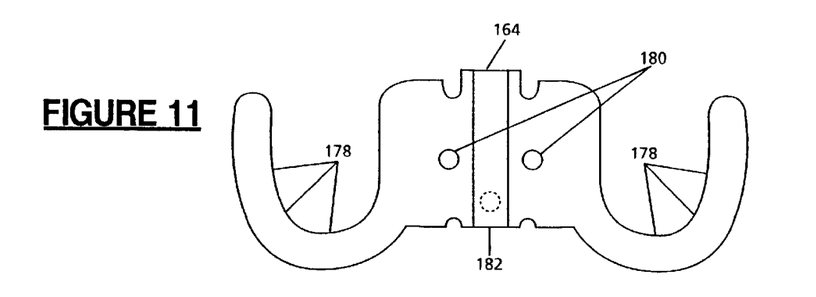
FIG. 11. Detail showing a simple hook profile 178 formed in one piece of stamped metal, including holes 180 through which a retaining rivet or other fastener may be inserted and an embossed area 182 for centering a spring. Simple hooks in a preferred embodiment consist of a stamped metal form including a retention device 164.
Figure 12:
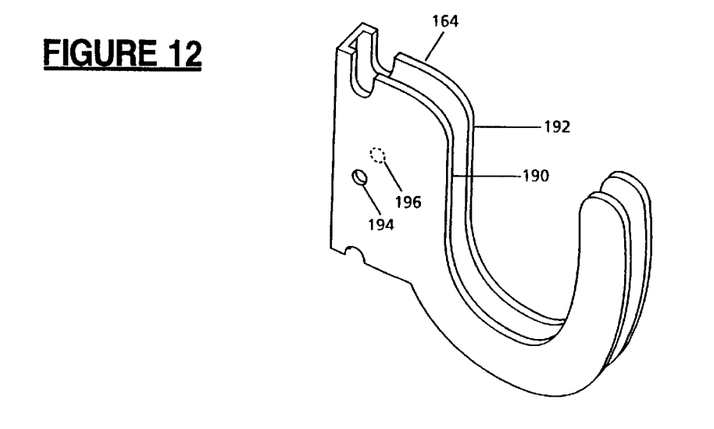
FIG. 12. Stamped form of FIG. 11, bent to a shape whereby the outer measurement snugly fits into the receiving member receptacle, the end of which forms a retention device 164 (See, FIG. 7). A positive retention latching device 176 (See, FIG. 13) is capable of being inserted between the parallel planar surfaces 190 and 192. Holes 194 and 196 when in alignment enable insertion of a rivet pin therethrough.

FIG. 6 exhibits a cross sectional view of a receiving member receptacle 142 in cargo control track 140, the cargo control track, a fastener 152, a cutaway view of cargo control track 140 attached to a supporting surface 146. FIG. 7 describes a typical retention device 164 comprising an upper resilient finger 166 adjacent to an upper notch 168 enabling lifting retention end 164 while inserting upper finger 166 high enough to allow lower resilient finger 170 to clear the lower opposing end edge 172 of the receiving member receptacle 142 and be lowered. The lower notch 174 of FIG. 8 engages the lower opposing end edge 172 of the receiving member receptacle 142. To remove the retention device, the retention device 164 is lifted, tipped or tilted and lowered from the receiving member receptacle. FIG. 9 describes engagement of the retention device in a receiving member receptacle as in FIG. 8 adding a positive engagement latch 176 pulled back to enable lifting retention device 164 into the receiving member receptacle. FIG. 10 exemplifies the positive engagement latch 176 engaged in a position that restricts motion of the retention device thereby preventing its removal from the receiving member receptacle 142. To remove the fitting, positive engagement latch 176 is pulled back, enabling sufficient motion of the retention device 164 thereby enabling removal from the receiving member receptacle 142. FIG. 11 details a simple hook profile 178 formed in one piece of stamped metal, including holes 180 through which a retaining rivet may be inserted and an embossed area 182 for centering a spring. Simple hooks in a preferred embodiment consist of a stamped metal form including a retention device 164. FIG. 12 displays the stamped form of FIG. 11, bent to a shape whereby the outer measurement snugly fits into the retention hole of cargo control track. A positive retention latching device is capable of being inserted between the parallel planar surfaces 190 and 192. Holes 194 and 196 must be in alignment to enable insertion of a rivet pin therethrough.

Figure 13:
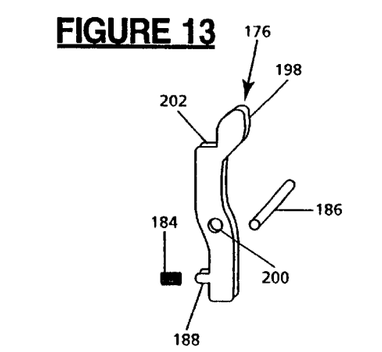
FIG. 13. A latch profile 176, including a finger actuated tab 198, a hole 200 which is slightly larger in diameter than a rivet 186, and a spring tab 188 which holds a spring 184, and at proper length acts as a pivotal motion limit.
Figure 14:
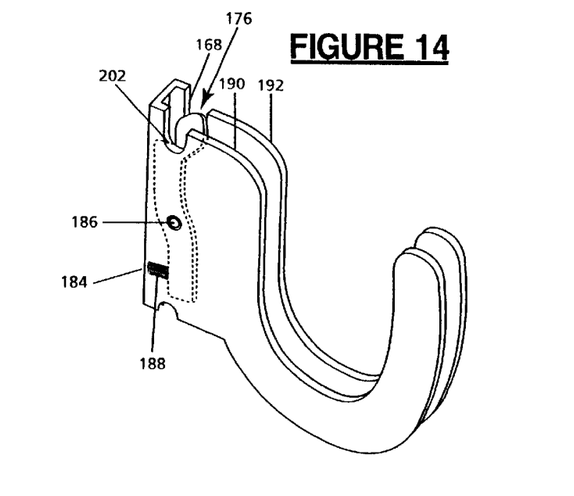
FIG. 14. Latch profile 176 inserted between parallel planar surfaces 190 and 192 with spring 184 retained on spring tab 188 and held in place with rivet 186. The height of surface 202 is disposed in proximity as to cause an interference in upper notch 168 (See, FIG. 7) by the action of spring 184 thereby preventing removal of the retention device from the receiving member receptacle 142 (See FIG. 10).
Figure 15:
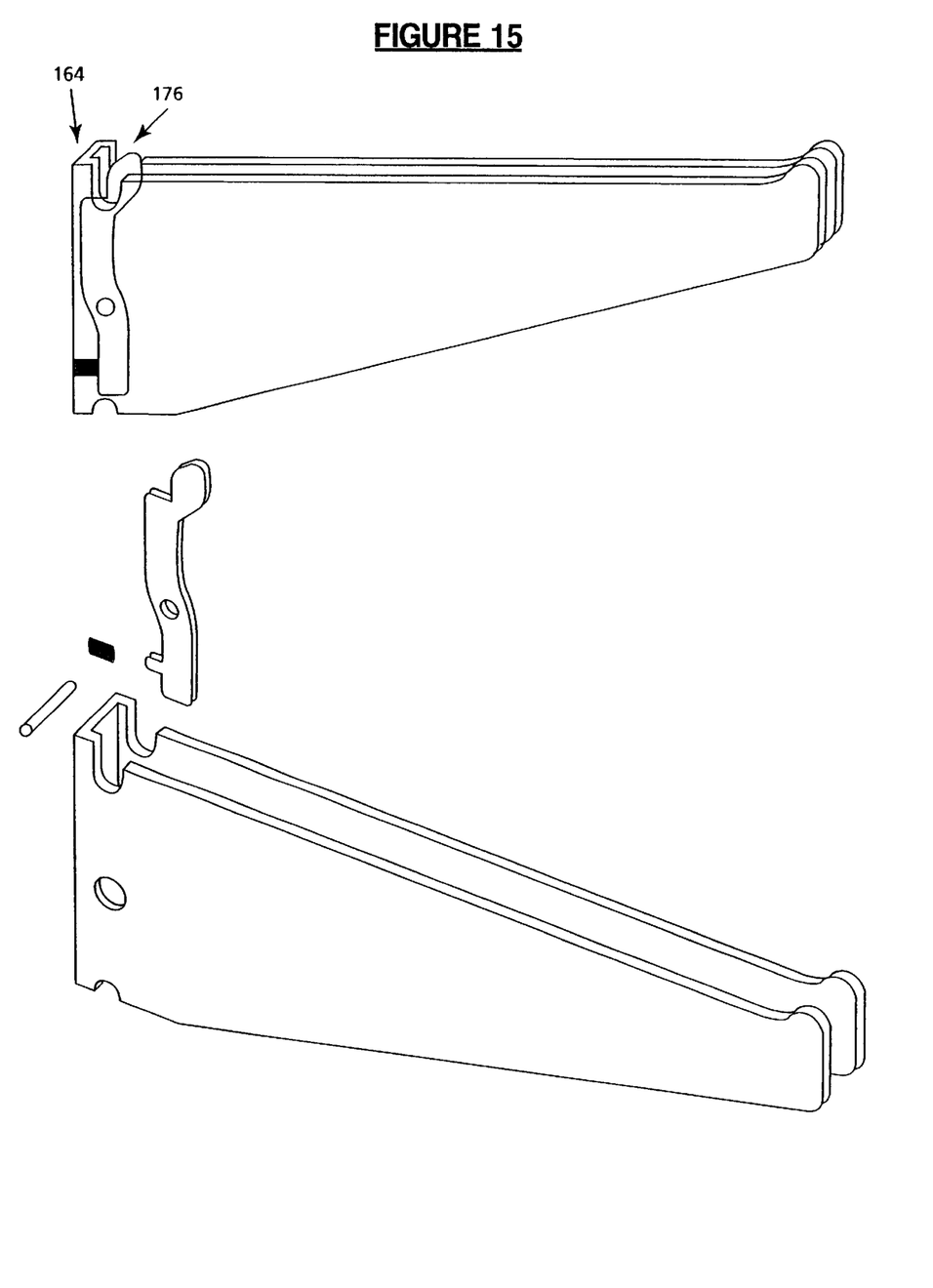
FIG. 15. Shelf bracket with profile terminating in a retention device and fitted with a positive retention latch 176.
Figure 16A:
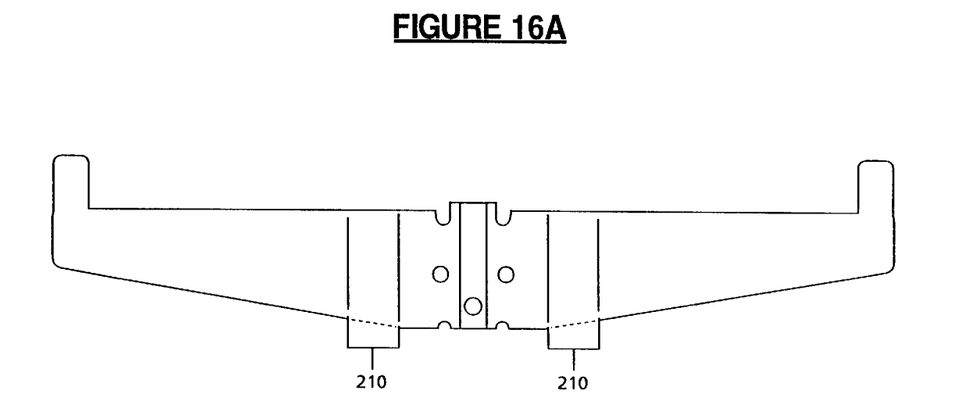
FIG. 16A. Pre-bent flat diecut stamped shape. Flange 210 provides improved stability.
Figure 16B:
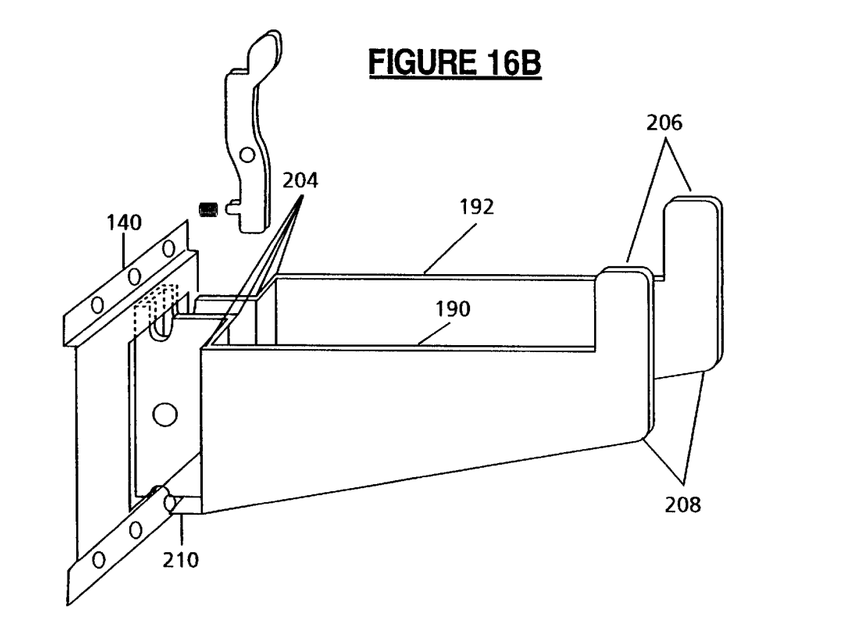
FIG. 16B. Flange 210 is shown bent back toward the cargo control track 140, provides interference with the receiving member cargo control track surface thereby providing enhanced stability, limiting horizontal movement of the retention device. Four additional bends 204 allow widening of the area between the parallel planar surfaces 190 and 192 in order to enable accommodation of handles or add stability to objects for storage. Two extended tabs 206 are provided of an extended height in order to better retain stored implements. The length of the protruding arms 208 is variable as is its contour and shape.

FIG. 13 shows a latch profile 176, including a finger actuated tab 198, a hole 200 which is slightly large in diameter than a rivet 186, and a spring tab 188 which holds a spring, and at proper length acts as a pivotal motion limit and an interference surface 202. The latch profile 176 is shown in FIG. 14 as inserted between parallel planar surfaces 190 and 192 with spring 184 retained on spring tab 188 and held in place with rivet 186. The height of the interfere surface 202 is disposed in proximity as to cause an interference in upper notch 168 by the action of spring 184 thereby preventing removal of the retention device from the cargo control receiving member receptacle 142 (See FIG. 10). A shelf bracket with profile terminating in a retention device and fitted with a positive retention latch 176 is shown in FIG. 15. FIG. 16 describes four additional bends 204 allow widening of the area between the parallel planar surfaces 190 and 192 in order to enable a ccommodation of handles or add stability to objects for storage. Two extended tabs 206 are provided of an extended height in order to better retain stored implements. The length of the protruding arms 208 is variable as is its contour and shape. Flange 210 provides improved stability. Flange 210, shown bent back toward the cargo control track 140, provides interference with the cargo control track surface thereby providing enhanced stability, limiting horizontal movement of the retention device.

Figure 17:
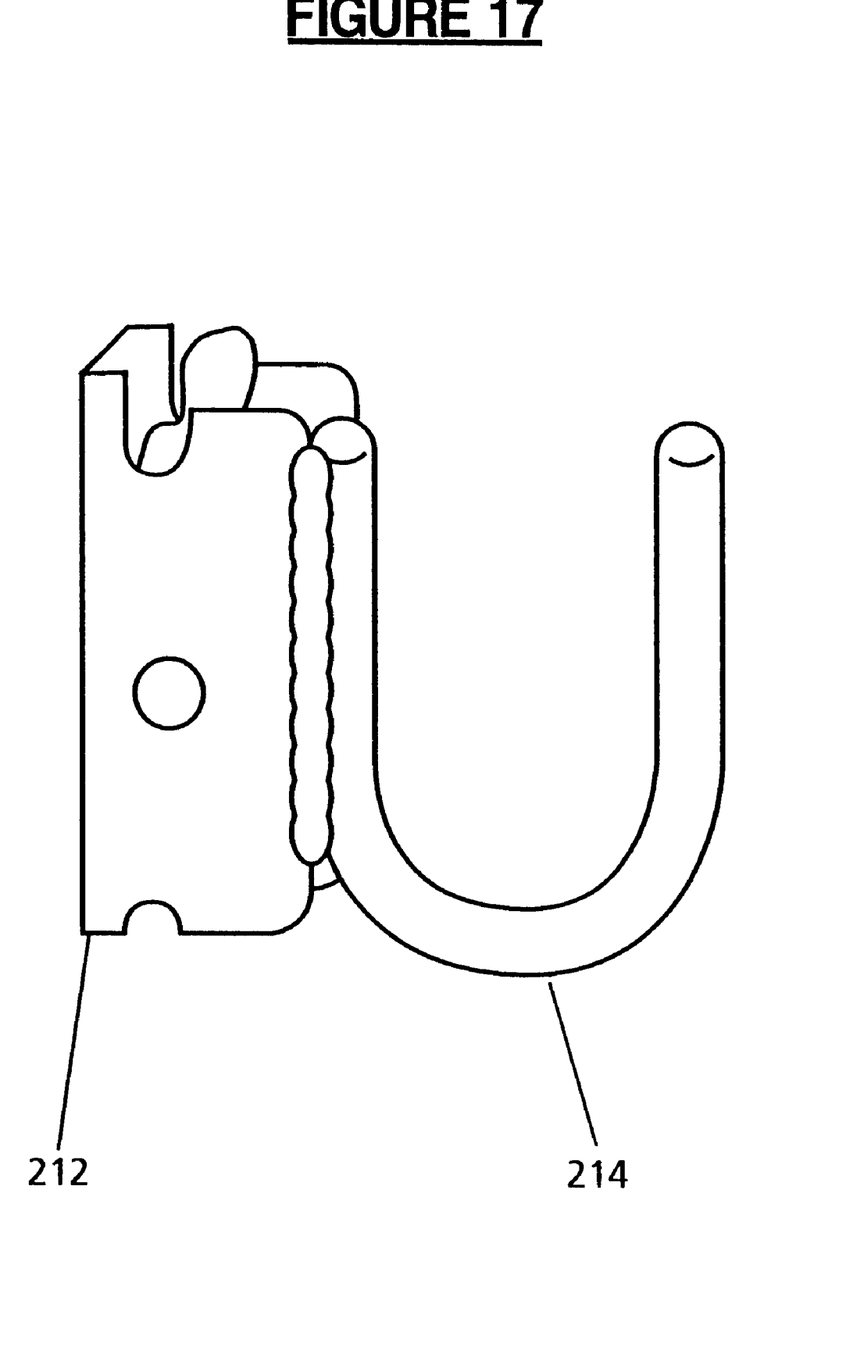
FIG. 17. Devices exemplifying use of series EIA spring loaded fittings 212 together with a bent wire form 214 welded to the fitting.
Figure 18:
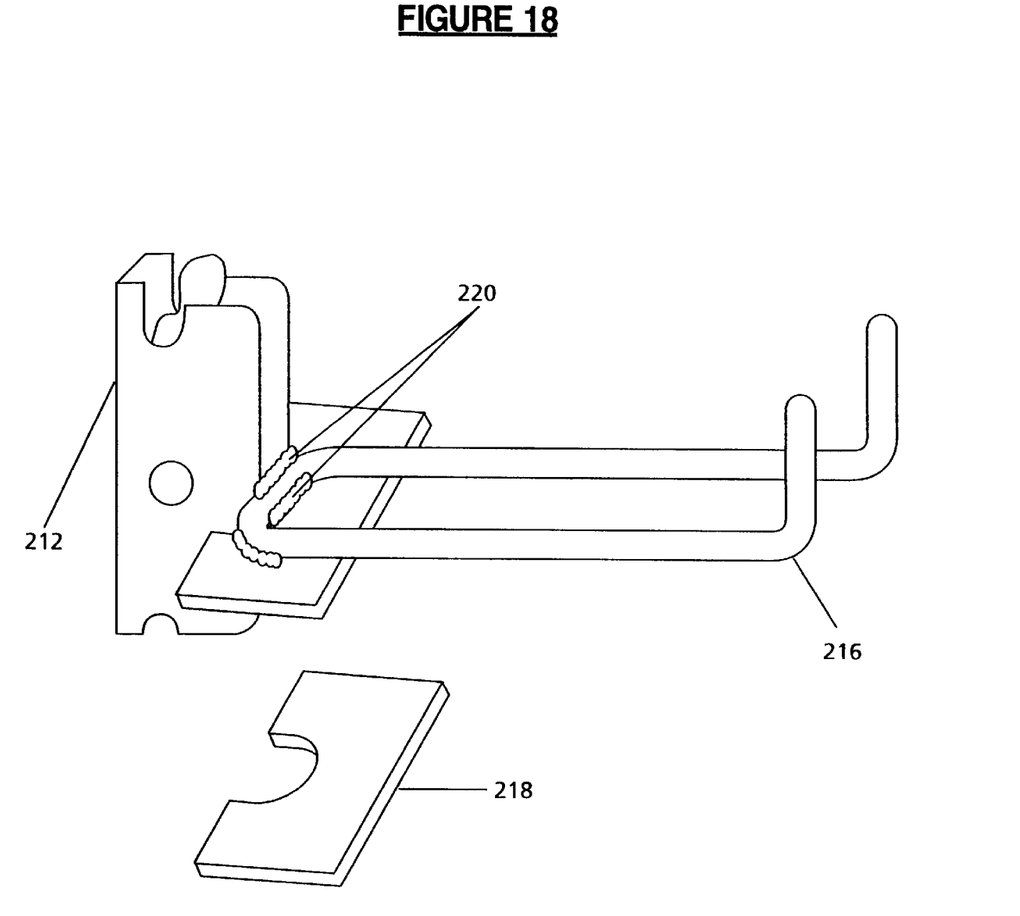
FIG. 18. Rake or Shovel Hook exemplifying attached double hook shape which may be welded, bolted, crimped or inserted to a standard E-clip fastener. A spring loaded fitting 212, welded 220 to a long wire form hook 216, and a stabilizer tab 218 fitted to the fastener in order to create interference with the surface of the cargo control track thereby providing enhanced stability, limiting horizontal movement of the retention device.
Figure 19:
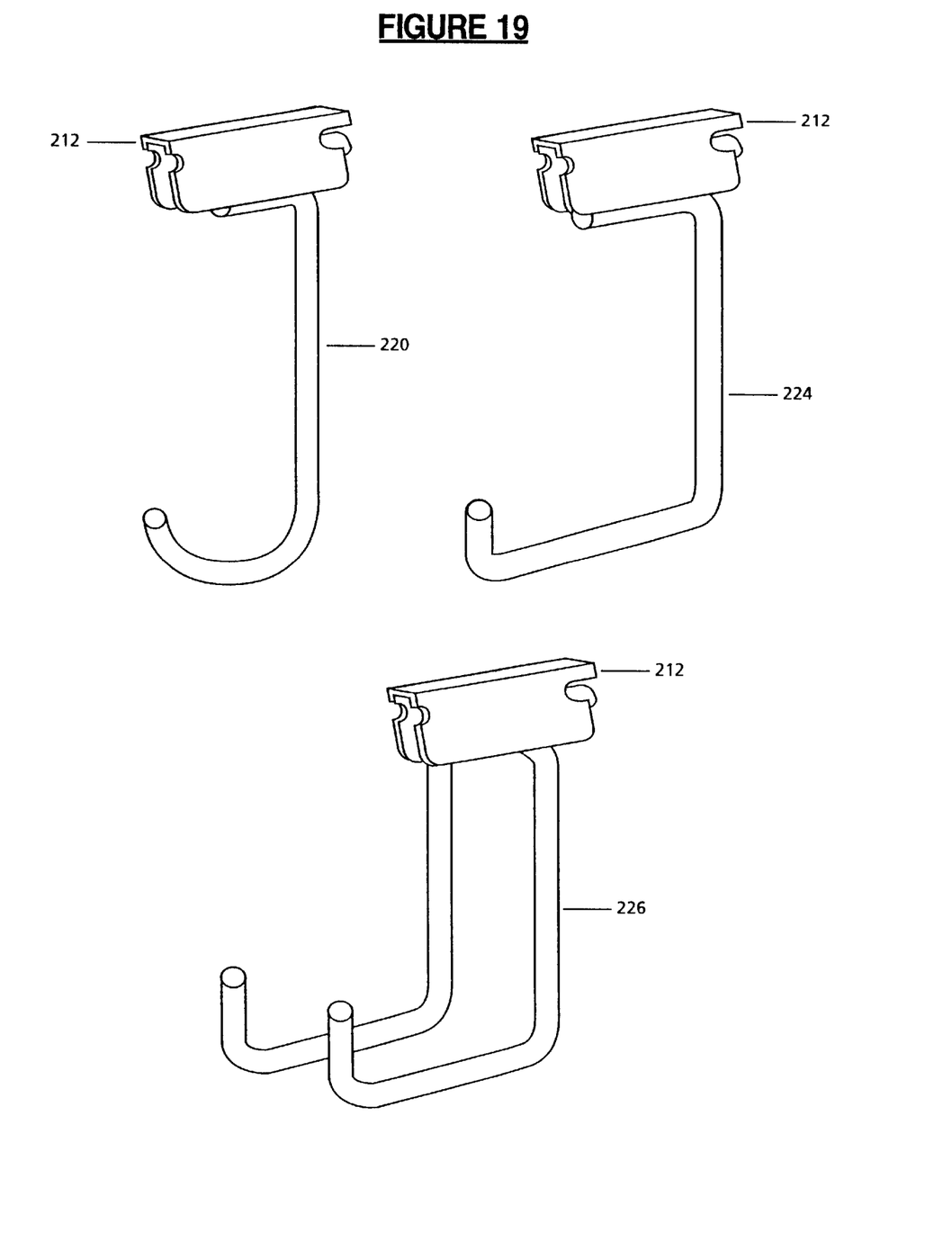
FIG. 19. Wire form hook shapes attached to spring loaded fittings including examples of tension load devices incorporating an insertion device 212 attached to variable contour and shape protruding arms 220, 240 and 226 designed to support loads from an overhead receiving member cargo control track member such as in a ceiling-mounted application.

Devices exemplifying use of series E/A spring loaded fittings are shown in FIG. 17. An example of a commercially available E/A spring loaded fitting is Kinedyne Model FE8306-1 212. The spring loaded fitting of FIG. 17 is shown together with a bent wire form 214 welded to the fitting. FIG. 18 shows a spring loaded fitting 212 welded 220 to a long wire form hook 216, and a stabilizer tab 218 fitted to the fastener in order to create interference with the surface of the cargo control track thereby providing enhanced stability, limiting horizontal movement of the retention device. FIG. 19 displays wire form hook shapes 220, 224, 226 attached to spring loaded fittings. These are non-limiting examples of supports capable of being inserted in an overhead receiving member cargo control track, such as in a ceiling-mounted application.

Figure 20:
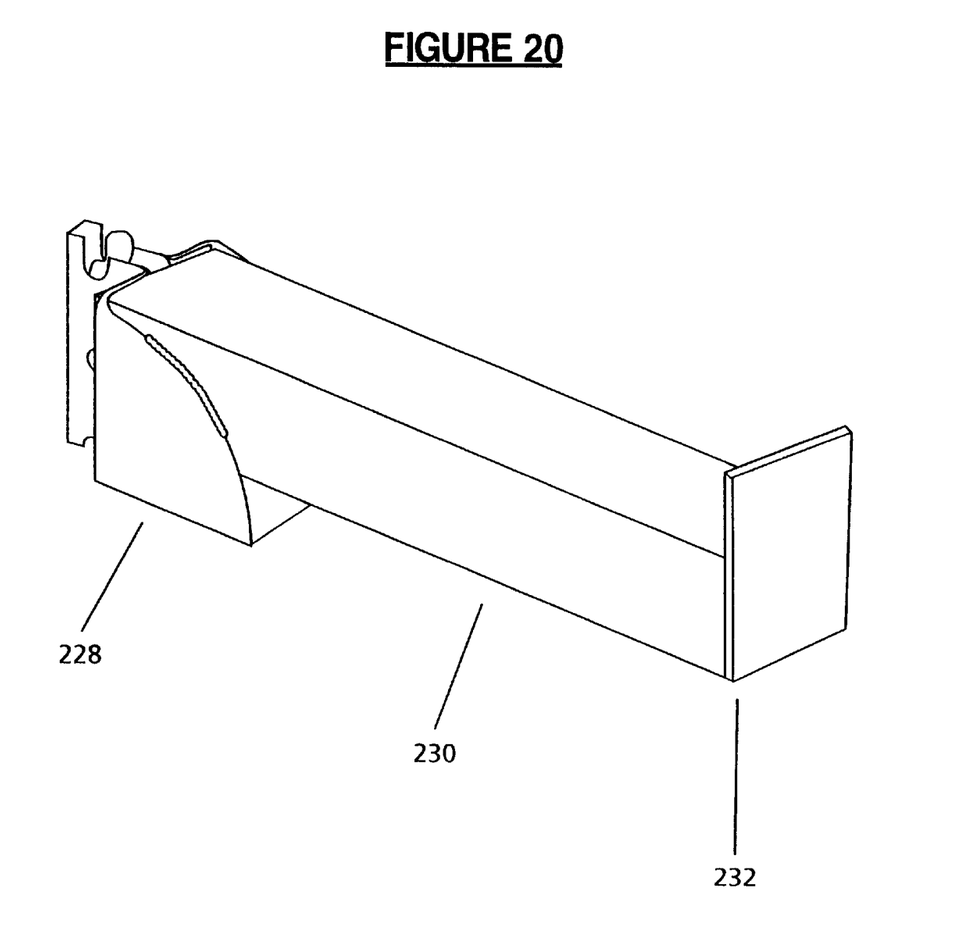
FIG. 20. Cantilever support member such as a shelf bracket is formed by welding a standard wood beam socket 228, to a rigid extended member 230 body portion. An extended retention plate on the end 232 is provided in this example.
Figure 21:
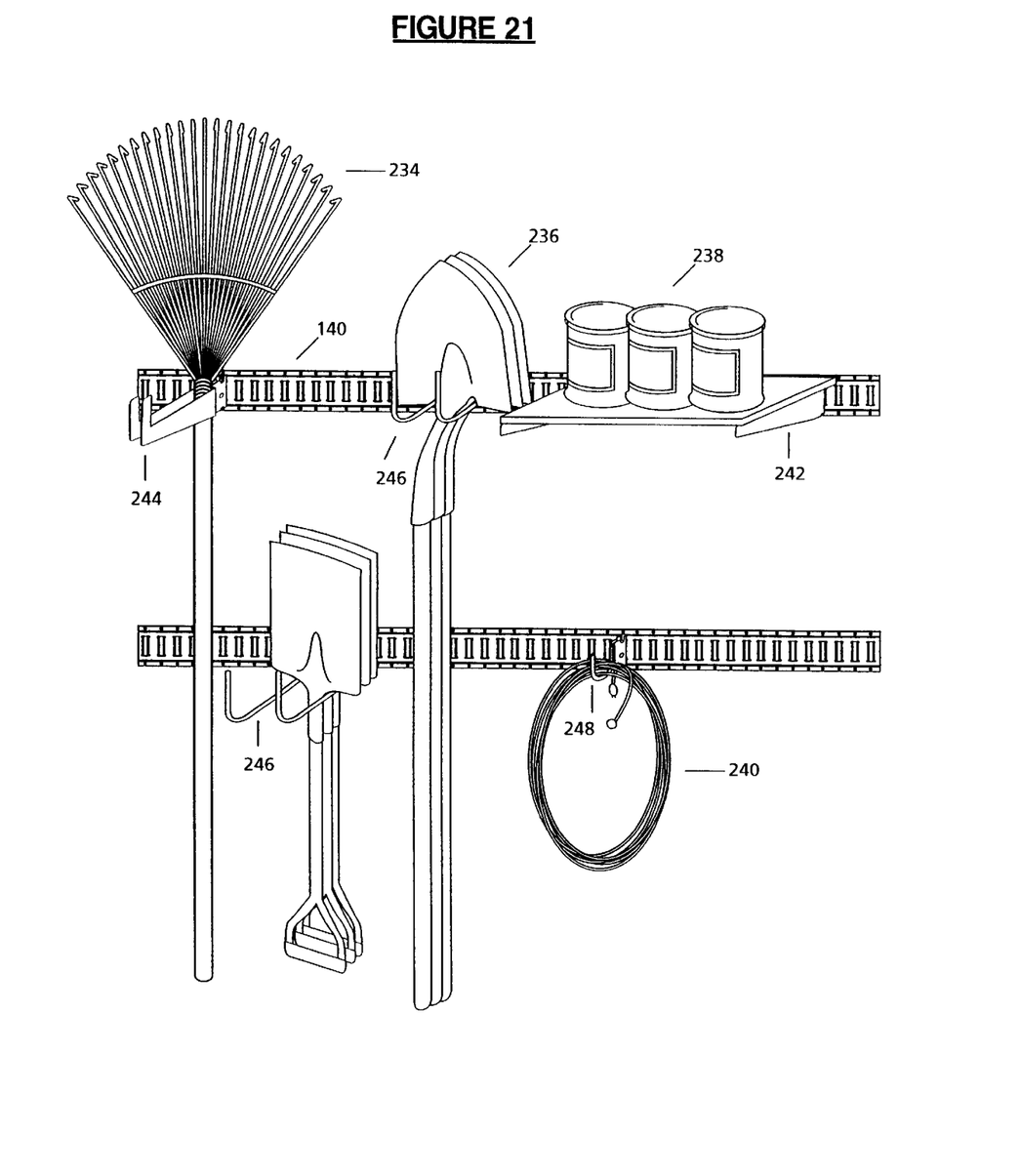
FIG. 21. Various implements, including shovels 236, rakes 234, cords 240, cans 238 stored respectively on brackets 246, 244, 248 and shelf 242, wherein the brackets and shelf are arranged cooperating with track 140.
Figure 22:
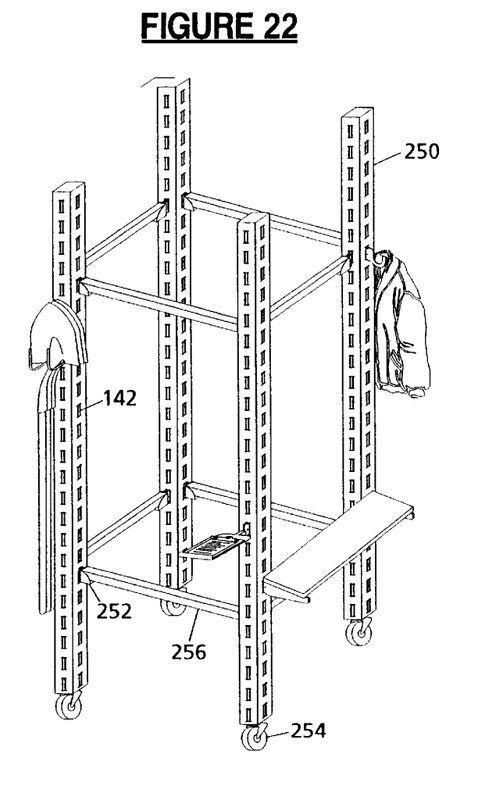
FIG. 22. Example of a free-standing rack system shown constructed of rigid box tube uprights 250 comprising receiving member receptacles 142 cooperating with small beam sockets 252 and shelf support beams 256. This example includes optional caster wheels 254.
Figure 23:
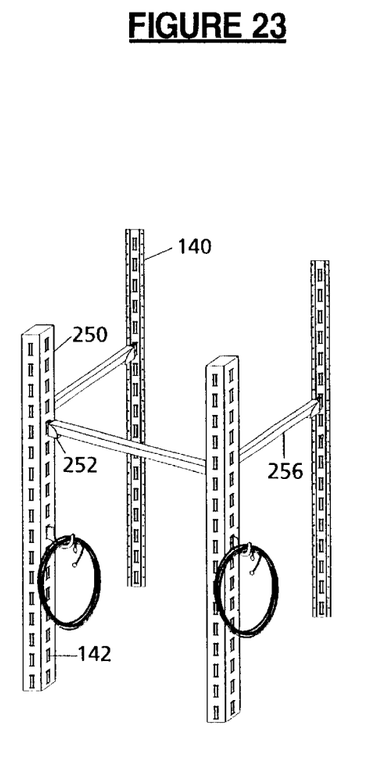
FIG. 23. Rigid box tube uprights 250 with receiving member receptacles 142 cooperating with small beam sockets 252 and shelf support beams 256 shown in this example with wall mounted cargo control track 140.
Figure 24:
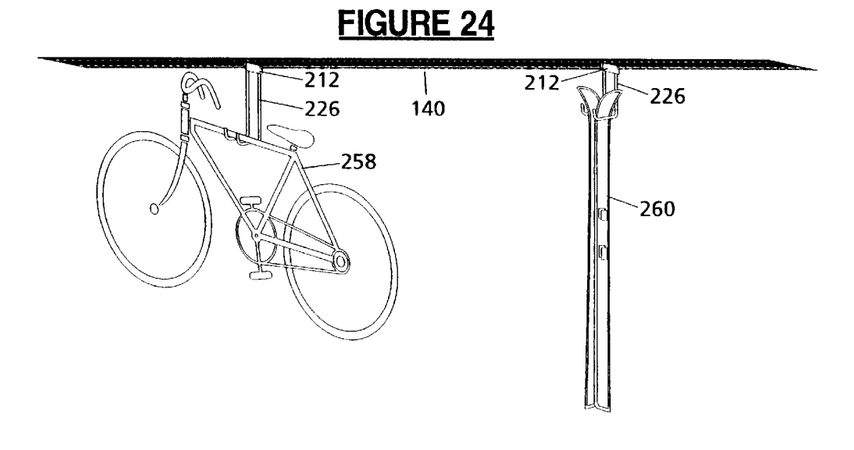
FIG. 24. Cargo Control Track 140 shown in this example mounted in an overhead (ceiling) mounted application cooperating with hook profiles 226 and attached to a spring-loaded fitting 212 and supporting a bicycle 258 and skis 260.

A cantilever support member is shown in FIG. 20. An example of a cantilever support member includes but is not limited to a shelf bracket which is formed by welding a standard wood beam socket 228 to a rigid extended member 230. An example of a commercially available wood beam socket is such as Kinedyne Part No. 1845. An extended retention plate on the end 232 is also provided. FIG. 21 exemplifies storage of various implements, including shovels 236, rakes 234, cords 240, cans 238 respectively on brackets 246, 244, 248 and shelf 242, wherein the brackets and shelf are arranged cooperating with receiving member track 140.

The present invention provides the advantage of combining the strength and economy of scale of cargo control track with the novel application of a plurality of cantilever load support devices including but not limited to hooks and brackets, tension load support devices and overhead mounted hooks and brackets which utilizing a retention device, cooperate with the receiving member receptacles of the cargo control track and may include a positive retention latching device. The track or receiving member may be fastened by commonly known means, including but not limited to screws, bolts, welding, rivets, expansion anchor type, molly type or other suitable fastening methods.

According to the present invention, a storage system includes both horizontally and vertically oriented receiving member cargo control tracks which may be affixed to either a free-standing support structure or the internal support structure of a building, vehicle or other supporting structure such as a fence or a wall.

Throughout this application, various publications and patents are referenced. The disclosures of these publications in their entireties are hereby incorporated by reference into this application in order to more fully describe the state of the art.

This invention may be embodied in other forms or carried out in other ways without departing from the spirit or essential characteristics thereof The present disclosure is therefore to be considered as in all respects illustrative and not restrictive, the scope of the invention being indicated by the appended Claims, and all changes which come within the meaning and range of equivalency are intended to be embraced therein.

I claim:

1. A storage device support member, comprising:
   a. at least one rigid elongated body portion comprising
      i. a shaped free end of the elongated body portion, capable of supporting a load,
      ii. a retention device attachment end of the elongated body portion,
   b. a retention device rigidly attached, to the attachment end of the elongated body portion, the retention device comprising
      i. a cargo control track insert, the insert having upper and lower notches which define at least one adjacent resilient finger which extends beyond the opposing edges of a receiving member receptacle
      ii. a positive engagement latch, movably mounted on the retention device, the positive engagement latch being movable between a notch blocking position and a release position, and
      iii. a positive engagement latch operating means, mounted on the retention device, capable of selectively enabling moving said positive engagement latch between the notch blocking position and the release position.

2. The storage device of claim 1, wherein the elongated body portion is a two pronged hook shape capable of supporting a load.

3. The storage device of claim 1, where the elongated body portion is in a horizontal orientation, capable of supporting a cantilevered load.

4. The storage device of claim 1 where the elongated body portion is a one pronged singular hook shape.

5. The storage device of claim 1 where the elongated body portion is a linear shape capable of supporting a shelf bracket.

6. The storage device of claim 1 where the retention device is attached to an overhead cargo control track and the elongated body portion is in a vertical orientation, capable of exerting a tension load.

7. The storage device of claim 1 where the elongated body portion is in a shape capable of engaging and supporting a rim mounted tire.

8. The storage device of claim 1 where the elongated body portion is a stationary rigid loop.

9. The storage device of claim 1 where the elongated body portion is a ring.

10. The storage device of claim 1 where the elongated body portion is a straight rod.

11. The storage device of claim 1, further comprising stabilizing tabs that extend perpendicularly to the control track insert, capable of limiting pivotal movement relative to the cargo control track.

12. A metal box tube member comprising a rectangular receiving member receptacle, capable of stably and reversibly attaching to the retention device of claim 1.

* * * * *